Patented June 2, 1931

1,807,616

UNITED STATES PATENT OFFICE

NORRIS BOEHMER, OF MONTCLAIR, NEW JERSEY

PROCESS OF MAKING CLEAR CHLORINATED RUBBER SOLUTIONS

No Drawing.    Application filed April 19, 1924. Serial No. 707,580.

This invention relates to a process of making chlorinated rubber solutions and relates especially to the production of solutions which may be used in making paints, enamels, varnishes and other coating compositions, for making films, for use as a binder and various other purposes.

The chlorinated rubber employed herein may be made in various ways but is especially adapted for the treatment of pressure chlorinated rubber, that is rubber chlorinated by chlorine under superatmospheric pressure without the presence of organic solvents. Processes of this sort have been described in detail in copending patent applications filed by Carleton Ellis and also by the present applicant.

Pressure chlorinated rubber may be obtained directly in a dry state (i. e. without any organic solvent therefor) but contains considerable chlorine and hydrochloric acid and also is frequently contaminated with iron from apparatus employed. Water also is likely to be present due to having been originally present in the raw rubber employed.

The chlorinated rubber may be extracted with hot hydrochloric acid solution and subsequently boiled with water to purify, and then dried in vacuo. Such material is much lighter in color than the raw chlorinated material as obtained from the chlorinator but usually contains traces of moisture and not infrequently traces of iron. It is difficult to grind the chlorinated rubber fine enough to remove all traces of iron or hydrochloric acid or moisture by this procedure.

Another method of procedure is to break up the mass of chlorinated rubber obtained by pressure chlorination forming coarse fragments which are put into a churn or agitator without first washing with water. Benzol or other solvent is added and the mixture is churned or agitated until a solution is obtained. Any chlorine present is liable to attack the solvent and chlorine and hydrochloric acid both are destructive to apparatus. If however a quantity of quick lime is added sufficient to neutralize the hydrochloric acid and chlorine and remove traces of moisture, solutions are easily obtained which have a high degree of clarity and are good in color. The neutralization of the hydrochloric acid and chlorine as fast as it is liberated from the masses of chlorinated rubber during solution, prevents injury to apparatus. After a neutral solution has been obtained the product may be run into settling tanks and the calcium chloride, calcium hypochlorite and hydrated lime and any unchanged quick lime allowed to settle. The clear solution is withdrawn and is ready for use in making coating compositions or for other purposes. A solution of say 20 per cent strength may be prepared in this way. Higher or lower concentrations also are possible.

On the other hand if a solution is obtained from the product of the water washing method noted above, by simply dissolving the same, it will usually be turbid due to moisture and may be treated with calcium chloride. This not only removes the turbidity but appears to have a clarifying effect causing any brown coloration attributed to iron, to largely disappear. A little quick lime may be present if desired to remove any traces of acid.

Other drying agents may be employed and various other neutralizing agents, other than quick lime, also may be used. Carbonate of soda and also marble dust may be used in some cases.

The most effective cheap solvent is benzol but other solvents such as carbon bisulphide, toluol, xylol, solvent naptha, carbon tetrachloride, trichlorethylene and the like may be employed. Gasoline or mineral spirit is not a good solvent for chlorinated rubber and should not be used except in minor proportion. Chlorinated rubber swells but does not dissolve readily in spirts of turpentine but the latter may be used in conjunction with more effective solvents. Slow drying solutions having the property of brushing out well should be made from such solvents for example as xylol or solvent naphtha, with or without the addition of turpentine.

I have found chlorinated rubber made by the pressure chlorination process to be readily soluble in a mixture of equal parts benzol and acetone. Thus I have obtained clear solutions containing 20 per cent of chlorinated rubber dissolved in equal parts of these solvents and clarified with calcium chloride. It is a surprise to me that acetone or similar ketones function with benzol or similar hydrocarbons to form a composite solvent for chlorinated rubber, since acetone alone does not dissolve it. Such a degree of solubility affords a means of incorporating shellac or other substances which are not soluble in the hydrocarbon or chlorinated hydrocarbon solvents heretofore recognized as the available solvents for chlorinated rubber.

The following is an illustration of the procedure involved in this invention. A 20 per cent benzol solution of chlorinated rubber which had been chlorinated by the pressure method and purified by means of washing with dilute acid and water, after which it was vacuum dried, was of a dark green color and so turbed as to be practically opaque. Calcium chloride in an amount slightly greater than that necessary to remove the water was added and agitated with the solution, with slight warming. A very small amount of liquid settled in a layer beneath the chlorinated rubber solution. This liquid upon standing crystallized to a white solid. The solution during this operation lost its turbidity. A small amount of hydrogen chloride fumes were noticeable and by shaking the solution with a little quick lime these were eliminated. When the quick lime and calcium chloride had settled from the solution it was found to have a light yellowish brown color. As a further illustration 13 parts by weight of chlorinated rubber, as it came from the chlorinator, which had undergone no washing or other purification was agitated with 20 parts of benzol. 8 parts of quick lime and 4 parts of calcium chloride were added to the mixture before agitation was started. The original chlorinated rubber was slightly moist and contained considerable dissolved chlorine and hydrogen chloride. The solution obtained after settling was of a light yellowish brown color, clear and showed no evidence of free hydrogen chloride.

What I claim is:—

1. A process which comprises washing chlorinated rubber to remove some of the water-soluble impurities therein, thereafter dissolving the partly purified chlorinated rubber in a solvent, and treating the solution thereof with quick lime.

2. A solution of chlorinated rubber in a composite solvent including an aromatic hydrocarbon of the benzol series and acetone.

3. A clarified solution of chlorinated rubber in a mixture of about equal parts of aromatic hydrocarbon of the benzol series and acetone.

4. A chlorinated rubber solution in a solvent comprising acetone.

5. A chlorinated rubber solution in a solvent comprising acetone, said solution containing about 20% of the chlorinated rubber.

6. A chlorinated rubber solution is a composite solvent containing a ketone of the acetone series.

7. A solution containing chlorinated rubber and substances insoluble in aromatic hydrocarbons of the benzol type, in a composite solvent, including acetone and a liquid which is a solvent for such chlorinated rubber.

NORRIS BOEHMER.